April 29, 1947.  L. C. SHORT ET AL  2,419,693

SEWAGE DISPOSAL SYSTEM

Filed Jan. 29, 1943

Inventor
LEO CHARLES SHORT
EWALD A. IWEN

Reynolds + Beach
Attorney

Patented Apr. 29, 1947

2,419,693

UNITED STATES PATENT OFFICE 2,419,693

SEWAGE DISPOSAL SYSTEM

Leo Charles Short and Ewald A. Iwen, Seattle, Wash., assignors to The Austin Company, Seattle, Wash., a corporation of Ohio Application January 29, 1943, Serial No. 473,946

14 Claims. (Cl. 210—5)

Sewage disposal systems of the bio-filtration type have heretofore had certain disadvantages and limitations. These have been overcome by our invention, which pertains in particular to the relative elevations of the various components and the control of circulation through such a system.

As the name implies, a bio-filtration system incorporates two principal filtration and settling liquid circuits, the untreated sewage emptying into a primary circuit and the fully treated sewage being discharged from a secondary circuit. Each such circuit includes a settling tank and a bacterial filter bed of gravel. These filter beds require a continuous flow of liquid through them in order to keep the bacteria in active condition. If a bed should be allowed to dry out many of its bacteria would die, and the desired purification would not occur. The inflow of sewage into the system varies, however, and at times very nearly ceases or becomes so slight as to allow the filter bed to dry out sufficiently that it deteriorates. Consequently it has been necessary to recirculate through the system sufficient liquid to insure that the filter beds will be kept moist at all times.

Such a bio-filtration system incorporates in each circuit a settling tank which is quite deep and of large capacity, and a filter bed which is shallow and of relatively small capacity. These circuits are connected in series, the sewage flowing from the primary circuit to the secondary circuit. In the former the sewage enters the settling tank, flows through the filter bed, and then to the entrance compartment of a sump. In the secondary circuit the partially treated sewage flows from the outlet compartment of the sump first through the filter bed, and then to the settling tank, from which it is discharged from the system.

In order to provide for recirculation through the filter unit of the secondary circuit provision is made for liquid to flow from the settling tank back to the common sump, as well as to the discharge outlet of the system. The liquid thus recirculated supplements that flowing into the sump from the primary circuit so that a constant quantity is bumped from the sump to the filter bed. Heretofore the secondary circuit settling tank and the sump have been at approximately the same elevation and liquid flowed by gravity from the settling tank to the sump only when the water level in the sump dropped below the level of the water in such tank. Also liquid flows by gravity from the primary circuit settling tank through the primary circuit filter bed to the sump, and an appreciable gravity head is required between the settling tank and the filter bed to rotate the distributing spray pipe. Since the elevation of the sump was approximately the same as the secondary circuit settling tank, and the first circuit filter tank was above the sump, the primary circuit settling tank was necessarily placed at a higher elevation than the secondary circuit settling tank. Such arrangement presented no problem where a slight grade was available.

Difficulty arose, however, in installations on level ground where, in order to obtain a sufficient difference in elevation of the settling tanks, it became necessary either to build up above the ground the top of the first circuit settling tank or to sink the sump and the second circuit settling tank down into the ground a distance sufficient to provide the necessary gradient for the first fluid circuit. Either alternative greatly increases the expense of the system, and in some conditions neither expedient may solve the problem. In low land, for example, it may not be feasible to lower the second circuit settling tank, for it might then be below the tide or drainage level. On the contrary, if the first circuit settling tank is raised it may be impossible to drain the sewage from the sewer system into it by gravity, and a pumping system would be required to feed the disposal plant.

It is our principal object to eliminate the disadvantages of prior bio-filtration systems resulting from the necessity of locating the settling tank in the second circuit below that in the first circuit, by placing these two settling tanks at substantially the same elevation. Although the sump interconnecting the two circuits is considerably below the second circuit settling tank, we control the recirculation of liquid through the secondary circuit filter bed by regulating positively the return flow from the second circuit settling tank to the sump, instead of relying upon the equality of liquid level in the sump and in such settling tank. In accomplishing such object we provide mechanism which is simple and dependable in action, and rugged in construction, so that it will operate effectively, and will not require frequent attention or repair.

Also it is an object during such recirculation flow to increase the aeration of the liquid to facilitate its purification. Moreover the aeration of the sewage may be similarly augmented at additional locations, if desired.

A further object of our invention is to decrease substantially the cost of installing a bio-filtration system on land which is level or very nearly so. In addition, it enables such a system to be employed on tidelands or in similar localities where the body of water into which the filtered sewage is to be drained is only very slightly below the outlet from the sewer system.

To illustrate an installation which has proven to be practical the arrangement of the drawings incorporates a particular type of valve, but it will be understood that similar control may be effected by valves of other types. Nevertheless we prefer the particular type of float controlled valve shown because of the increased aeration which its use produces in the sewage, in addition to affording the necessary flow control.

Figure 1:
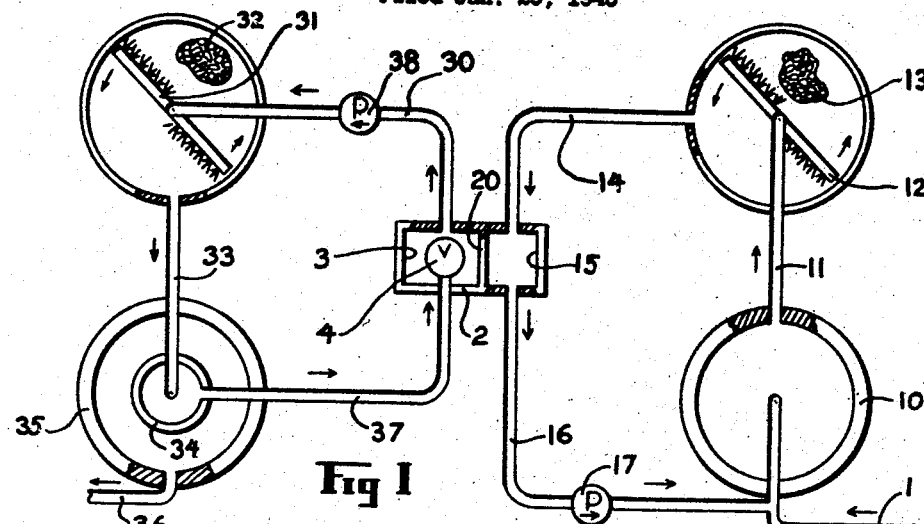
Figure 1 is a diagrammatic plan view of our bio-filtration system showing the primary and secondary recirculation circuits, through which the liquid follows the same course as in prior practice.

The relative arrangement of the several units of a bio-filtration sewage disposal system may vary according to the terrain, the location of the inlet from the sewer system to the disposal system, and the location of the outlet from the disposal system. The disposition shown in Figure 1 is therefore merely diagrammatic. The sewage which flows into the inlet 1 enters first a settling tank 10 in the primary circuit. From this tank the overflow passes by way of conduit 11 to the rotary spray pipe 12 revolving above the first filter bed 13, which consists of bacteria activated gravel. The filtered liquid drains from this bed through pipe 14 to the intake compartment 15 of the sump 2 interconnecting the primary and secondary filtration circuits. From the compartment 15 the sewage may flow over the weir 20 into the sump discharge compartment 3, which is the first element of the secondary circuit. From the sump the sewage is pumped by a pump 38 through pipe 30 to the rotary spray pipe 31 of the secondary circuit filter bed 32. Liquid which drains from this filter passes through pipe 33 to an entrance compartment 34 of the second circuit settling tank 35. The wall of such entrance compartment, or a section of it, may constitute a weir over which the liquid flows into the settling tank proper. Final discharge from the system is by way of the outlet 36.

Flow through the primary circuit of this system is accomplished by gravity, the various elements being located upon appropriate progressively lower levels. Thus filter bed 13 is sufficiently below the outlet of pipe 11 from settling tank 10 so that the hydraulic head provided will rotate the distributing spray arm at the desired speed. The outlet pipe 14 must lead from the filter bed 13 at a point low enough to effect proper drainage for filtering flow through the bed. The compartment 15 of sump 2 is somewhat below the filter bed drain so that the liquid will flow to it easily.

Because of the weir 20 the level of the liquid in sump compartment 3 is somewhat lower than that in compartment 15. This liquid is pumped to filter bed 32 with a pressure sufficient to rotate spray arm 31 at the proper speed. Again pipe 33 must lead from a point in the filter bed sufficiently low to enable the liquid to be filtered effectively through it, and the entrance compartment 34 in the settling tank 35 must be somewhat below the filter outlet. The system outlet 36 then must be located lower than the discharge end of pipe 33 and weir 34.

If a filter bed is allowed to dry out the effectiveness of the bacterial action is greatly decreased, and may be wholly destroyed. Ordinarily a continuous flow of sewage into the system cannot be guaranteed, and consequently it has been necessary to provide a recirculation flow through the filter beds of both the primary and the secondary circuits. For this purpose the various elements have heretofore been placed at the relative elevations shown in Figure 2. As stated above, gravity effects flow of the sewage between the settling tank 10, the filter bed 13, and the entrance compartment 15 of sump 2 by locating the sump sufficiently below such settling tank. A sewage recirculation line 16 for the primary circuit is connected between the sump entrance compartment 15 and the inlet 1, through which a constant flow of sewage in a quantity sufficient to keep filter 13 moist is maintained by a pump 17. Such forced recirculation insures that at least a predetermined minimum quantity of liquid, for example 200 cubic feet per minute, will be flowing through the filter bed 13 at all times, and this is augmented by the inflow of untreated sewage through pipe 1 from the sewer system. If no sewage were flowing into the system, however, there would be no flow from sump compartment 15 into sump compartment 3 over the weir 20 despite such recirculation, and flow into the secondary circuit would at all times correspond only to the flow into the system through the pipe 1, although lagging behind the intake flow. Admixture of the liquids in the primary and secondary circuits is undesirable.

In the secondary circuit recirculation of liquid has been provided through filter bed 32 heretofore by gravity flow through a conduit 37 back from the entrance compartment 34 of the settling tank 35. This settling tank entrance compartment must be at an elevation to dispose the surface of its liquid slightly below the top of weir 20 so that liquid will flow from it to sump compartment 3 when the liquid level in the latter drops below a predetermined level because of lack of adequate flow over weir 20. Filter bed 32 is therefore necessarily located above the outlet sump compartment 3, so that the liquid may drain from it by gravity into the entrance compartment 34 of the settling tank 35.

The pump 38 is arranged to pump a constant quantity of liquid which would exceed the maximum inflow into the system through pipe 1, for example 1000 cubic feet per minute. When less than this quantity flows over sump weir 20 from compartment 15 into compartment 3 the deficiency is made up by recirculating gravity flow from settling tank compartment 34 to the sump through conduit 37. As the liquid level drops in compartment 3 the flow through conduit 37 automatically increases. Conversely, as more liquid flows over weir 20 to raise the level of liquid in sump compartment 3 the flow through pipe 37 decreases. It is important that pump 38 be capable of pumping the maximum expected sewage inflow capacity, because it is undesirable, except in cases of extreme emergency, for liquid to flow from the sump directly to the settling tank, as would occur if the pump were incapable of pumping the sewage out of compartment 3 at least as fast as it flowed over weir 20.

Figure 2:
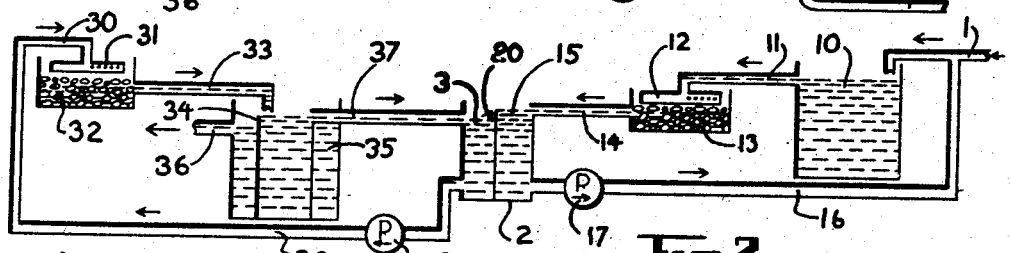
Figure 2 is a diagrammatic vertical sectional view, showing the relative elevations of the various components of the bio-filtration type of system used heretofore.

The settling tank 35 was therefore necessarily located heretofore at substantially the same elevation as the sump 2, as shown in Figure 2. Estimating generally the drop in liquid level between the settling tank 10 and the discharge compartment 3 of the sump, the head required for rotating spray pipe 12 is two or three feet. Depending on how close together the units are placed, the flow from one unit to the next might require a drop of one-half a foot, while the drop in the filter bed 13 might be one to two feet. In the sump itself the drop might be one-half a foot. Adding together these various increments, it will be found necessary to locate the discharge sump compartment 3 from four to six feet lower than the settling tank 10.

Figure 3:
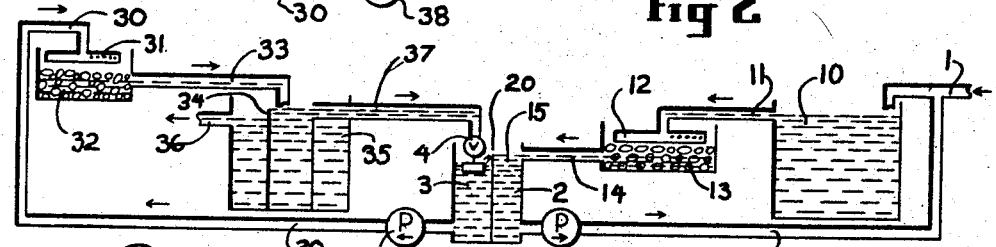
Figure 3 is a diagrammatic vertical sectional view, illustrating the relative elevations of the parts in an installation incorporating our invention.

While in such previous practice, therefore, a continuous flow through the filter beds has been maintained, it has nevertheless been necessary to dispose the settling tanks 10 and 35 at substantially different elevations. With our arrangement, however, both settling tanks, as shown in Figure 3, may be located at the same elevation, although the difference in level between filter beds 13 and 32 may be greater. This latter variation, however, is of relatively minor importance because the filter beds are much shallower and of much smaller capacity than the settling tanks, and hence easier to build up above ground level or dig below it. The settling tanks must, of course, be of large capacity so that the movement of liquid through them will be comparatively gradual. The filter beds afford little storage capacity and a continuous flow through them takes place. When the settling tanks are disposed at the same elevation the control scheme for recirculating liquid through the secondary circuit employed in prior systems is ineffective.

The primary circuit may be the same in our system as in the conventional type of system described, as will be evident from a comparison of the portion at the right of Figure 2 with the corresponding portion of the system shown in Figure 3. The difference in elevation occurs in the secondary circuit, filter bed 32 and settling tank 35 being placed enough higher relative to sump 2 so that the settling tanks will be at approximately the same level. In previous systems of the type shown in Figure 2, the flow from the settling tank entrance compartment 34 to the secondary circuit from compartment 3 was regulated by the liquid level in these two compartments, as described above. When the settling tank 35 is not depressed relative to the sump, however, such liquid level control cannot be employed, since the difference in elevation is sufficiently great that maximum flow would occur at all times. We have solved this problem by positively restricting the flow through conduit 37 from the settling tank to the sump by means of a valve, generally indicated at 4.

Despite such positive control of liquid flow from settling tank 35 to sump compartment 3 through conduit 37 the delivery of pump 38 to filter bed 32 may be maintained at a constant value if a float operated control valve 4 is employed. Such a valve will compensate for any variation in flow over weir 20 by admitting from pipe 37 a quantity of liquid equal to the deficiency between the capacity of pump 38 and the flow of liquid over the weir 20. Not only does our valve thus regulate the flow, but it increases the aeration of the recirculated sewage by the liquid splashing as it flows out of the valve.

Figure 4:
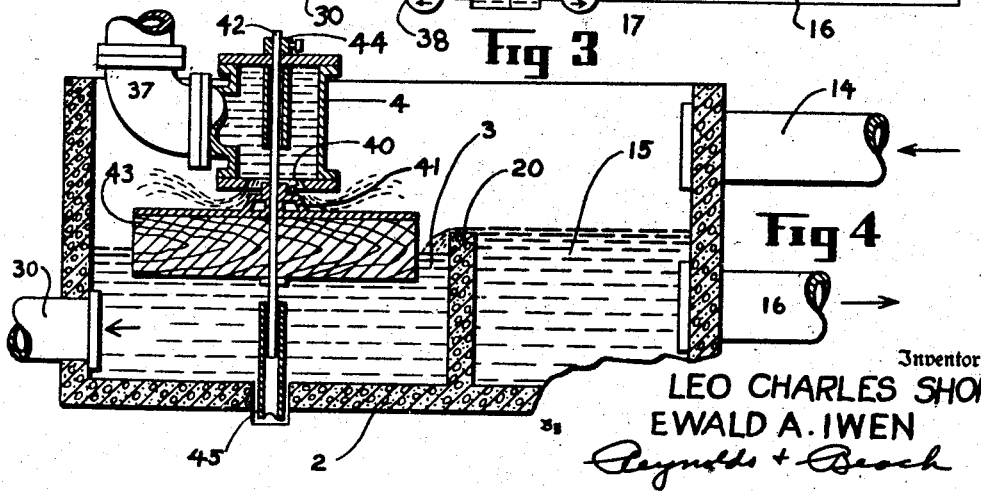
Figure 4 is an enlarged vertical section through the sump interconnecting the primary and secondary circuits, and showing the details of our valve controlling the flow of liquid recirculating through the secondary circuit.

The valve itself, as shown in Figure 4, incorporates a valve body having a downwardly facing seat 40 in its lower wall. With this seat engages a valve element 41 which is guided for reciprocation toward and from the valve seat, such as by being secured to the valve stem 42. Connected with the valve element, and also guided by the valve stem, is a float 43, which, in the form shown, is integral with the valve element 41, but may be secured directly to the valve stem 42 independently of the valve element, or otherwise operatively connected to the valve. The valve element may be mounted adjustably on the valve stem, and in the latter case the valve element and float may be adjustable independently along the stem to vary the float location for a given valve opening. A collar 44 may be adjustably secured upon the upper end of the stem to seat upon the upper end of the valve body as the water level in sump compartment 3 drops, thus to limit the amount of valve opening. The lower end of the stem may slide in a suitable guide tube 45 embedded in the bottom of the sump.

As long as the flow of liquid over weir 20 is sufficient to maintain the height of the water in compartment 3 at a predetermined level despite the quantity of liquid pumped out by pump 38, the float 43 will hold valve element 41 seated to cut off flow of recirculating liquid through pipe 37 from settling tank 35 to the sump. As the quantity of sewage flowing into the system through pipe 1 diminishes, however, the flow from the primary circuit to the secondary circuit over weir 20 will also decrease. Since the quantity of liquid pumped from compartment 3 will not vary, however, the liquid level in it will fall so that the float 43 will move downward to open the valve. The liquid flowing over weir 20 will thus be supplemented by recirculation liquid discharged from pipe 37 through valve 4.

As long as the liquid level continues to drop the valve 4 will open progressively until a condition of equilibrium has been reached, in which event float 43 will come to rest and the discharge of liquid through the valve will remain constant. If the flow over weir 20 again increases, the liquid level in sump comparment 3 will rise, lifting float 43 to decrease the opening between valve element 41 and seat 40. Despite the location of tank 35 at a higher elevation than sump 2, therefore, the quantity of recirculating liquid flowing through pipe 37 will be regulated accurately in response to the height of the liquid in the sump according to the difference between the amount of liquid flowing from the primary circuit to the secondary circuit over weir 20 and the demand of the constant delivery pump 38.

It will thus be seen that settling tanks 10 and 35 may be located at the same elevation, and in fact tank 35 may even be at a higher elevation than tank 10, if desired, although prior practice required that the secondary circuit settling tank always be substantially lower than the primary circuit settling tank. Despite the relative elevation of these tanks, our valve arrangement provides accurate and reliable control of the liquid recirculating through the secondary circuit. In addition liquid flowing from valve 4 between the valve seat 40 and the valve 41, having a considerable velocity head, will strike the upper side of float 43 forcefully and splash upward, as indicated in Figure 4. This action increases the aeration of the recirculating liquid to expedite the oxidation of the sewage residue. Similar valves may be incorporated at other locations in the system for this purpose, such, for example, as at the discharge end of pipe 14, at the discharge end of pipe 33, or for emptying the outflowing liquid into an additional sump interposed in the discharge conduit 36.

What we claim as our invention is:

1. A sewage disposal system comprising a sump arranged to receive influent at varying or random rates, a filter bed at a level above said sump, means, including a constant-delivery pump, connecting said sump to said filter bed for delivery of influent from the sump to the filter bed at a constant rate which exceeds the normal influent rate to the sump, means, including a gravity flow conduit, connecting the filter bed to the sump, for return of filtered liquid to the sump at a substantial head, valve means in said gravity flow conduit, and automatically operable in accordance with the instantaneous influent rate to the sump, to maintain such return flow at a rate sufficient to insure return to the sump of sufficient volume of liquid to compensate for the volume difference between filter supply rate from and influent rate to the sump, and means to effect discharge from the system of filtered liquid in excess of such compensating volume.

2. A sewage disposal system comprising two settling tanks at substantially the same elevation, into the first of which flows influent, and the second having means to control discharge of effluent, a filter bed interconnected between said two settling tanks for flow of sewage therethrough from the first to the second, a pump for effecting continuous flow of liquid through said filter bed at a rate in excess of the normal inflow rate to the system, conduit means for returning filtered liquid to the intake side of said filter bed, and means operable in response to the difference between the actual inflow rate and the pump supply rate, to control flow through said conduit to make up such difference.

3. A sewage filtration system, comprising, in series, a primary liquid circuit and a secondary liquid circuit, each including a settling tank and a filter bed, the settling tanks of said two circuits being at substantially the same elevation, the primary circuit tank receiving influent and the secondary circuit tank having means to control discharge of effluent, a sump common to and interconnecting the two circuits, and disposed at an elevation lower than both of said settling tanks, said primary circuit including conduit means arranged for recirculation of liquid from said sump through said primary filter bed, pump means operatively connected in said primary circuit to effect such recirculation, said secondary circuit including conduit means arranged for elevation of liquid from the sump to a discharge point above said secondary circuit filter bed and settling tank, pump means operatively connected in said secondary circuit to effect such elevation and discharge, a recirculation conduit leading from said secondary circuit settling tank to said sump for returning by gravity to the sump liquid discharged from said secondary circuit filter bed, and means for regulating the flow of recirculating liquid through said recirculating conduit in response to variations in the liquid level in said sump, for increasing such flow when such liquid level drops below a predetermined elevation.

4. A sewage disposal system, comprising, in series, a primary liquid circuit and a secondary liquid circuit, a sump interconnecting said circuits, said primary circuit including a settling tank receiving influent, and located at a substantial elevation above said sump, a filter bed at an elevation below said settling tank and connected to receive liquid therefrom and to discharge liquid into said sump; and said secondary circuit including a settling tank having means to control discharge of effluent, and located at substantially the same elevation as said primary circuit settling tank and at a substantial elevation above said sump, a filter bed above said secondary circuit settling tank arranged to discharge liquid into said settling tank, means to deliver liquid from said sump into said secondary circuit filter bed, and a recirculation conduit connecting said second circuit settling tank and said sump for gravity flow of recirculating liquid from such tank to the sump; and means for limiting the flow of liquid through said recirculation conduit to said sump.

5. A sewage disposal system, comprising, in series, a primary liquid circuit and a secondary liquid circuit, a sump interconnecting said circuits, said primary circuit including a settling tank receiving influent, located at a substantial elevation above said sump, a filter bed at an elevation below said settling tank and connected to receive liquid therefrom and to discharge liquid into said sump, and said secondary circuit including a settling tank having means to control discharge of effluent, located at substantially the same elevation as said primary circuit settling tank and located a substantial elevation above said sump, a filter bed above and arranged to discharge into said secondary circuit settling tank, means to discharge liquid from said sump into said secondary circuit filter bed, a recirculation pipe connecting said secondary circuit settling tank and said sump for flow of recirculating liquid from such tank to the sump, valve means located immediately above said sump for controlling flow of liquid through said recirculation pipe to said sump, and a float buoyed up by liquid in said sump and operable to open said valve in response to a drop in the liquid level in said sump, for increasing the flow of recirculating liquid through said pipe from said secondary circuit settling tank to said sump.

6. A sewage disposal system comprising a settling tank having means to control discharge of effluent, a filter bed above and connected to discharge into said settling tank, a fluid-filled sump receiving influent, below said settling tank, a pipe connecting said sump to said filter bed, a pump operable to pump liquid through said pipe from said sump to said filter bed, a pipe for discharging liquid into said sump from said settling tank, downwardly opening valve means in said second pipe disposed immediately above said sump, and a float integral with said valve means and of considerable lateral extent, said float being buoyed up by liquid in said sump for opening said valve in response to a drop in the level of liquid in said sump caused by pumping of liquid therefrom to said filter bed.

7. A sewage filtration system comprising a settling tank arranged for discharge of effluent at a rate approximating the influent rate to the system, a filter bed, means connecting said filter bed with said settling tank, for delivery of filtered fluid to the settling tank, means to receive influent, and to deliver a fluid which includes such influent to the filter bed continuously at a substantially constant rate which exceeds the normal influent rate to the system, and means to withdraw from said settling tank and to supply automatically to said filter supplying means fluid in an amount equaling the difference between the constant filter supply rate and the instantaneous influent rate.

8. A sewage filtration system comprising a filter bed, means to receive influent and to deliver the same with added fluid, continuously to said filter bed at a substantially constant rate which exceeds the normal influent rate to the system, means to receive filtered liquid from said filter bed, and arranged to discharge a portion thereof as effluent at a rate approximating the influent rate, and means connected and arranged to divert the remainder of such filtered liquid, in priority to its discharge as effluent, and to deliver the same as added fluid to said influent-receiving means, in volume which varies automatically in direct ratio to the deficiency in the actual influent rate below the selected constant rate of filter supply.

9. A sewage filtration system comprising a sump receiving influent, a filter bed connected to receive liquid from the sump, a settling tank connected to receive liquid from the filter bed, and formed with a weir over which flows effluent, a back flow connection to said settling tank below said weir, to deliver liquid from the settling tank to the sump in priority to its discharge over the weir as effluent, means to deliver liquid from the sump to the filter bed continuously at a substantially constant rate which approximates the maximum influent rate to the sump, and means controlling fluid flow through said back flow connection from the settling tank to the sump, to maintain it automatically in accordance with the influent rate, at a rate to supply any deficiency in such rate of flow, over and above the actual influent rate.

10. A sewage filtration system comprising a settling tank whence flows treated effluent at a rate approximating the influent rate to the system, a filter bed at a level above and having a conduit for discharge into the settling tank, a sump whereinto influent flows, at a level below the filter bed, and also having conduits, one to receive liquid from the settling tank, and another to deliver fluid to the filter bed, pump means operable to deliver fluid from the sump to the filter bed at a rate approximating the maximum influent rate to the sump, and means automatically operable in response to a change in such influent rate, to supply, from the settling tank to the filter bed, any deficiency in influent to the sump, below the maximum influent rate.

11. A sewage filtration system comprising a settling tank having means to regulate discharge of treated effluent at a rate approximating the influent rate to the system, a filter bed connected to discharge into the settling tank, a sump below the level of the settling tank, connected thereto to receive gravity flow from the settling tank, means to deliver influent to the sump in varying quantities, a conduit, pump means operable substantially continuously to deliver fluid by way of such conduit from the sump to the filter bed at a rate approximating the maximum influent rate to the sump, and means governing flow from the settling tank to the sump to supply continuously, from the settling tank, any deficiency in influent to the sump, below the maximum influent rate, said governing means being automatically operable in response to a change in such influent rate.

12. Apparatus for treating impure liquids comprising a settling tank having an overflow discharge for effluent, a filter bed arranged at a level to discharge by gravity into said settling tank, a sump arranged to receive influent, disposed at a level and connected to receive liquid by gravity from said settling tank in priority to said effluent overflow discharge, means to raise and deliver fluid from said sump to the filter bed at a substantially constant rate which exceeds the normal influent rate to the sump, and means controlled automatically in accordance with the influent rate to the sump to admit liquid from said settling tank to the sump in amounts sufficient to make up the difference between the current influent rate and such constant rate of delivery to the filter bed.

13. A sewage disposal system comprising a sump arranged to receive influent at varying rates, a filter bed at a level above said sump, means, including a pump, connecting said sump to said filter bed for delivery of influent from the sump to the filter bed at a constant rate which exceeds the normal influent rate to the sump, means, including a settling tank and a gravity flow conduit discharging into said sump under a substantial head, for return of filtered liquid to the sump and to said settling tank, valve means for varying the flow of liquid through said gravity flow conduit in accordance with variations of influent rate to the sump, to maintain a sufficient return flow to compensate for the volume difference between the pumping rate to the filter and the influent rate to the sump, and means associated with said settling tank to maintain outflow therefrom at a rate which varies inversely in accordance with such compensatory return flow to the sump, and hence directly in accordance with the influent rate to the sump.

14. A sewage disposal system comprising a sump arranged to receive influent at varying rates, a filter bed, means connecting said sump to said filter bed for delivery of liquid from the sump to the filter bed at a constant rate which is in excess of the normal influent rate to the sump, a settling tank arranged to receive filtered liquid from said filter bed, means to maintain discharge from said settling tank at a rate which is substantially the same as the inflow rate to said sump, a conduit connecting said settling tank to said sump, for return of liquid to the sump in priority to its discharge as effluent, and valve means automatically operable upon increase of influent volume to the sump to correspondingly decrease the volume of returned liquid through said conduit, and therefore to increase correspondingly the volume of effluent from said settling tank.

LEO CHARLES SHORT.
EWALD A. IWEN.

(Other references on following page)

REFERENCES CITED

The following references are of record in the file of this patent:

UNITED STATES PATENTS

| Number | Name | Date |
|---|---|---|
| 2,090,405 | Shook | Aug. 17, 1937 |
| 2,142,196 | Langdon | Jan. 3, 1939 |
| 2,038,866 | Dekema | Jan. 19, 1943 |
| 2,317,782 | Levine | Apr. 27, 1943 |
| 2,168,208 | Jenks | Aug. 1, 1939 |
| 2,154,132 | Mallory | Apr. 11, 1939 |
| 150,478 | Maxim | May 5, 1874 |
| 233,978 | Burrows | Nov. 2, 1880 |
| 303,927 | Froh | Aug. 19, 1884 |
| 2,097,779 | Shook | Nov. 2, 1937 |
| 2,141,979 | Halvorson et al. | Dec. 27, 1938 |
| 2,283,166 | Buell et al. | May 19, 1942 |
| 2,340,842 | Reybold et al. | Feb. 1, 1944 |
| 2,355,640 | Fischer et al. | Aug. 15, 1944 |
| 2,355,760 | Trebler | Aug. 15, 1944 |
| 2,366,917 | Levine | Jan. 9, 1945 |

FOREIGN PATENTS

| Number | Country | Date |
|---|---|---|
| 475,354 | British | Nov. 15, 1937 |